United States Patent [19]

Brock

[11] 4,038,447
[45] July 26, 1977

[54] FLAME RESISTANT INSULATION BLANKET

[76] Inventor: Wayne C. Brock, 4120 Sunnyside Road, Minneapolis, Minn. 55424

[21] Appl. No.: 655,507

[22] Filed: Feb. 5, 1976

[51] Int. Cl.² .............................. B32B 3/00; B32B 3/02
[52] U.S. Cl. ........................ 428/72; 156/272; 428/71; 428/76; 428/166; 428/178; 428/315; 428/921
[58] Field of Search ............. 428/76, 178, 166, 192, 428/921, 102, 310, 315, 72, 71, 68, 69, 74; 156/272; 220/16; 52/309; 112/420, 440, 441

[56] References Cited

U.S. PATENT DOCUMENTS

| | | | |
|---|---|---|---|
| 2,927,626 | 3/1960 | Corwin et al. | 156/198 |
| 3,020,183 | 2/1962 | Calvaresi | 428/74 |
| 3,108,016 | 10/1963 | Longstreth et al. | 428/921 |
| 3,162,566 | 12/1964 | Katz | 428/74 |
| 3,199,481 | 8/1965 | Handwerker | 112/420 |
| 3,420,022 | 1/1969 | Brock | 428/76 |
| 3,523,055 | 8/1970 | Lemelson | 428/72 |
| 3,619,343 | 11/1971 | Freeman | 428/921 |
| 3,623,940 | 11/1971 | Gladstone et al. | 428/921 |
| 3,640,831 | 2/1972 | Gardener et al. | 428/72 |
| 3,663,463 | 5/1972 | Wren | 428/921 |

*Primary Examiner*—George F. Lesmes
*Assistant Examiner*—P. J. Thibodeau
*Attorney, Agent, or Firm*—Burd, Braddock & Bartz

[57] ABSTRACT

A portable insulation blanket made of flame resistant materials for protecting concrete surfaces. The blanket has a flame resistant core having a plurality of layers of insulating structures. Each layer of insulating structure has a plurality of closed cell portions defining gas containing chambers. A cover of flame resistant plastic sheet material encloses the core. The cover has edges that are stitched or welded together. A plurality of holding assemblies are mounted on the cover and project through the core to hold the core in a flat position between the covers.

22 Claims, 8 Drawing Figures

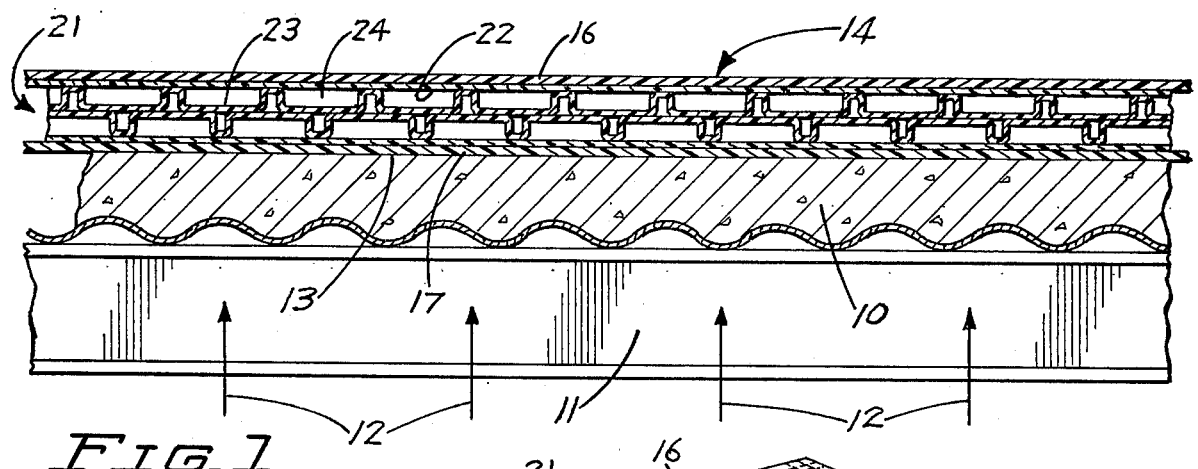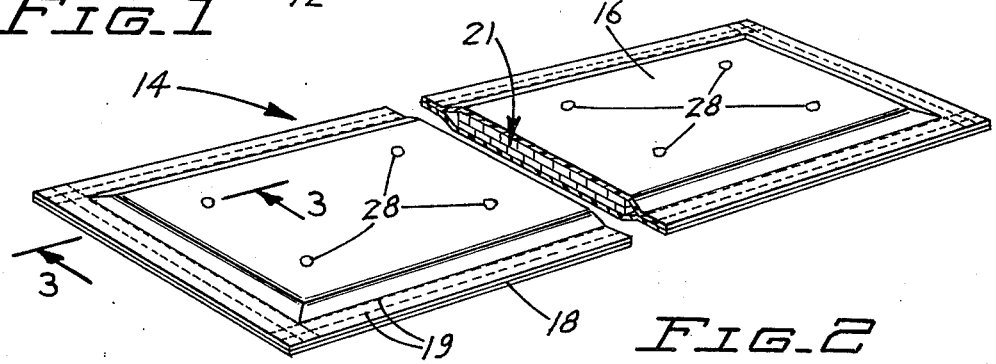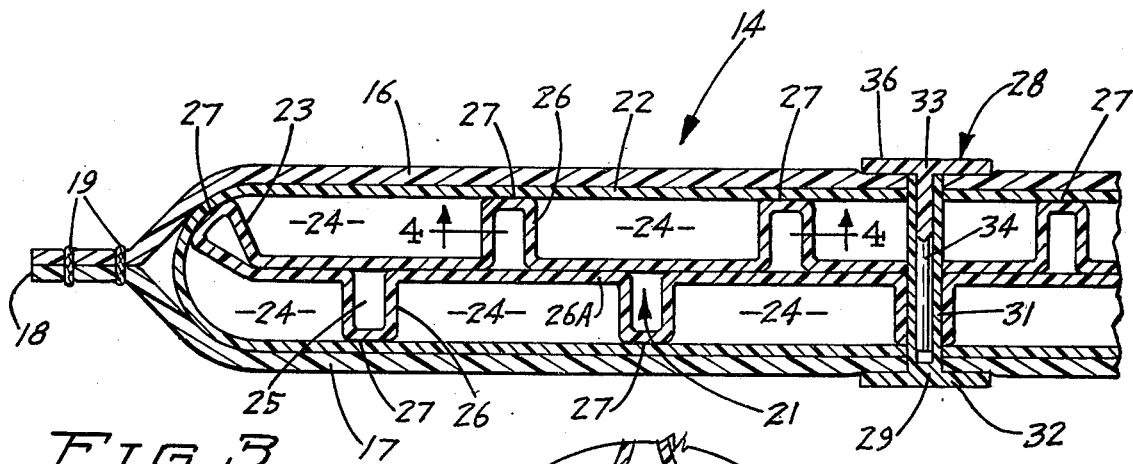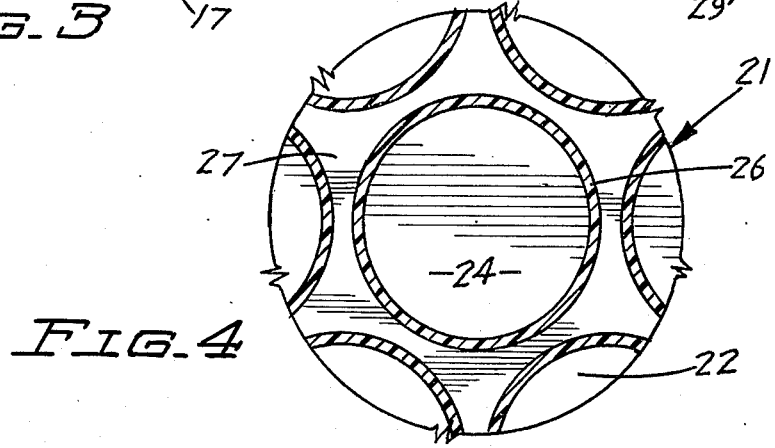

FLAME RESISTANT INSULATION BLANKET

BACKGROUND OF INVENTION

Portable insulation blankets are used in the construction industry to protect freshly poured concrete from freezing. An example of a concrete insulation blanket is shown by Brock in U.S. Pat. No. 3,420,022. This concrete insulation blanket has a seamless water impervious cover surrounding one or more sheets of flexible synthetic plastic insulation material. The cover is a polyolefin film. The cover surrounds a core of insulating material comprising expanded closed cell polyethylene. Other blankets have been used having cores of glass fibers. Examples of these types of blankets are shown by Corwin et al. in U.S. Pat. No. 2,927,626 and Katz in U.S. Pat. No. 3,162,566.

The construction industry as established safety requirements and standards for construction materials. These requirements include surface burning characteristics of the construction materials. A current standard is the ASTM designation E84-68. Other organizations, as Underwriters Laboratories and Factory Mutual, have developed standards for flame resistancy for construction materials. The film covers in the blankets currently in use, as described above, are not fire or flame resistant.

SUMMARY OF THE INVENTION

The invention is directed to an insulation blanket used to protect freshly poured concrete from low temperatures. The blanket is a relatively flat and flexible structure that can be readily rolled and transported. The blanket is composed of outer sheet members made of flame resistant plastic material. The outer peripheral edges are secured together to enclose a heat insulating core. The core has a plurality of closed cell chambers containing a gas, such as air, and is made of a flame resistant material. A plurality of holding assemblies are used to attach the core to the cover sheet members.

An object of the invention is to provide a durable and reusable concrete insulation blanket made of flame resistant materials which is usable with a minimum fire hazard. Another object of the invention is to provide a blanket having an insulating core with a plurality of closed cells for confining gas. A further object of the invention is to provide a concrete curing blanket made from material that is flame resistant, has low smoke generation, is self-extinguishing, and is in compliance with the flame resistance standards for construction materials. Yet another object of the invention is to provide a flame resistant concrete insulation blanket that is made from flame resistant plastic materials which is economical, easily processed and can be readily made into an insulation blanket. A further object of the blanket is to provide a concrete insulation blanket with holding assemblies that prevent the core from changing its shape and sagging during use, transportation or storage. These and other objects and advantages of the concrete insulation blanket of the invention are embodied in the following description of the preferred embodiment of the blanket.

In the Drawings:

FIG. 1 is a vertical sectional view of new concrete floor covered with an insulation blanket of the invention;

FIG. 2 is a foreshortened perspective view of the insulation blanket of FIG. 1;

FIG. 3 is an enlarged sectional view taken along line 3—3 of FIG. 2;

FIG. 4 is a sectional view taken along line 4—4 of FIG. 3;

DESCRIPTION OF PREFERRED EMBODIMENTS

Figure 5:
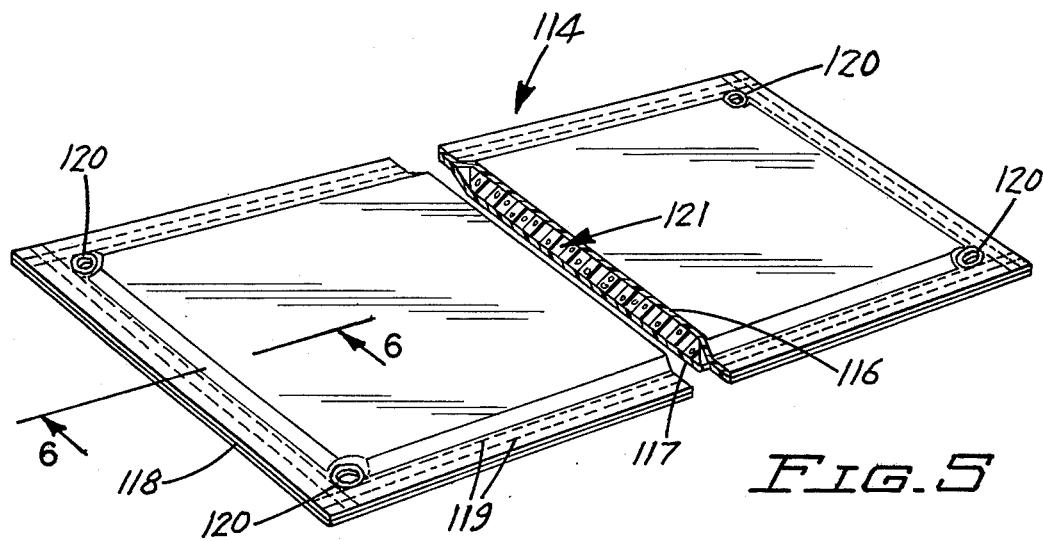
FIG. 5 is a foreshortened perspective view of a modification of the insulation blanket of the invention.
Figure 6:
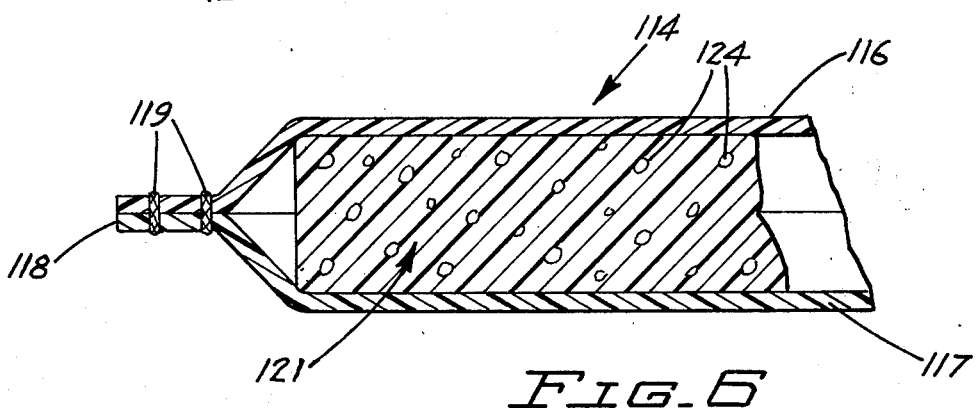
FIG. 6 is an enlarged sectional view taken along line 6—6 of FIG. 5.

Referring to the drawing, there is shown in FIG. 1 a freshly poured concrete floor 10 supported on a beam structure 11. During freezing weather, the concrete floor 10 is subjected to heat as indicated by arrows 12. The top surface 13 of the concrete floor 10 is covered with an insulating blanket indicated generally at 14. In practice, a plurality of blankets are used to cover the entire top of floor 10. Weights, as elongated boards and cement blocks, are normally placed on the blankets to prevent the wind from moving and shifting the blankets.

In the construction of a structure, including the floor, the electrical, heating and plumbing facilities are installed during erection of the structure. Heat and flame are used to weld, rivet, solder and bend the structural parts and joints. Also, portable flame heaters are used to supply hot air to warm the working environment during cold weather and provide heat to cure freshly poured concrete. The flames and heat create a fire hazard. The fire hazard is enhanced if flammable construction materials are present. The prior concrete insulating blankets which are made of flammable materials present a fire hazard. The insulation blanket 14 is made of fire resistant materials and thereby reduces the fire hazard at the construction site. Blanket 14 and additional blankets used to cover the floor have sufficient insulating characteristics to retain heat in the newly poured concrete for an extended period of time. The blankets are also made of durable materials that do not absorb moisture, so that moisture is retained in the concrete and external moisture is not absorbed by the blanket. Also, the blankets are made of material that does not stain or leave marks on the concrete surface.

As shown in FIG. 2, blanket 14 has a generally flat, rectangular configuration. The blanket may be of any practical length, preferably limited to a convenient size and weight for manual transportation. For example, blanket 14 may be 5 to 10 feet (1.5 to 31 meters) wide, 1 to 3 inches (2.5 to 7.5 cm) thick, and 20 to 50 feet (6 to 15.5 meters) long.

As shown in FIG. 3, the blanket 14 has a cover comprising a flexible upper sheet member 16 and a flexible lower sheet member 17. The edges 18 of the sheet members are superimposed on each other and attached together with two rows of stitches 19. The cover can be a single sheet member folded to provide upper and lower sides. The stitches then would be located on three sides of the sheet member to enclose the core 21. Stitches 19 are plastic threads and extend around the peripheral edge of the sheet members 17 and 18. Stitches 19 are straight or running stitches. Preferably, the stitches are long. That is, there are relatively few stitches per inch. The long stitches allow any moisture to flow out from between the sheet members 16 and 17.

Stitches 19 can be replaced with heat or sonic welds. Sheet members 16 and 17 can be plastic film or fabric of flame resistant materials.

A core indicated generally at 21 is located between the sheet members 16 and 17. Core 21 has a flexible outside or base layer or sheet member 22. Sheet member 22 is located adjacent the inside surfaces of sheet members 16 and 17. A second sheet member 23 is secured to the inside surface of the first sheet member 22. The second sheet member has a plurality of enclosed cells, pockets, or chambers 24 containing a gas, such as air. Chambers 24 are formed by circular walls or cup-shaped portions 26 of the member 23. The sheet member 23 is heat sealed at 27 to the member 22 so that the cells 24 are separate and independent of each other.

As shown in FIGS. 1 and 3, the core 21 has two layers made by folding the cup-shaped portions 26 so they are in a face-to-face relationship. As shown in FIG. 3, the two top portions 26A of the adjacent cup-shaped portions 26 engage each other. Additional air spaces 25 are located between adjacent cup-shaped portions providing the core with additional gas chambers.

The core 21 can have additional layers. For example, a second folded member similar to members 22 and 23 shown in FIG. 3 can be positioned in side-by-side relation between the sheet members 16 and 17.

Referring to FIG. 2, a plurality of button or holding assemblies indicated generally at 28 attach the sheet members 16 and 17 to the core 21. The assemblies 28 are spaced from each other and located in coordinated rectangular positions on the sheet members 16 and 17 to hold the core 21 in a flat position between the sheet members 16 and 17.

Referring to FIG. 3, button assembly 28 has a first member 29 having an upright tubular body 31 and a head 32. The head 32 is located adjacent the outside of the lower sheet member 17. The body 32 projects upwardly into core 21 and through suitable openings in the sheet member 16. A second member 33 having a shaft or rod 34 and a head 36 cooperates with the first member 29 to hold the button assembly in a fixed position on the sheet members 16 and 17. The shaft 34 fits into the tubular body 31 with a tight friction fit, thereby holding heads 32 and 34 in firm engagement with the outside faces of sheet members 17 and 16, respectively. Other types of tying structures can be used to hold the core 21 between sheet members 16 and 17.

Referring to FIG. 5, there is shown a modification of the insulation blanket of the invention indicated generally at 114. The blanket is an elongated generally rectangular unit having an upper sheet member 116 and a lower sheet member 117. The sheet members 116 and 117 form the cover of the blanket. The outer peripheral portions of sheet members 116 and 117 have overlapped portions or edges 118. A double row of stitches 119 secures the edges 118 together. Stitches 119 are straight or running stitches. Preferably, each stitch is relatively long so that there are few stitches per inch. The long stitches permit the adjacent edge portions to separate so that there are small passages which allow moisture and air to flow from between the sheet members 116 and 117. Fasteners 120, as grommets, are located in the corners of the blanket to facilitate hanging or vertical location of the blanket.

A heat insulating core indicated generally at 121 is located in the space between the sheet members 116 and 117. The core 121 is a flexible foamed plastic material having a plurality of closed cells 124 with air trapped in each cell. The core is in sheet form. One or more sheets or layers of material can be used to make the entire core. An example of the material comprising core 121 is a closed cell polypropylene foam. Other polyolefin foams, as polyethylene, can be used for the core. Admixtures or coatings are employed with the core material to make the core flame resistant.

Figure 7:
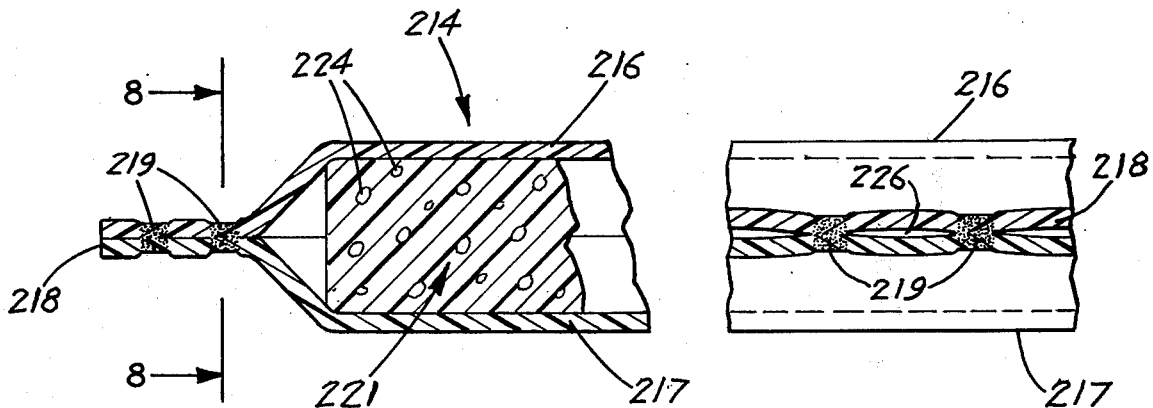
FIG. 7 is a sectional view similar to FIG. 6 of another modification of the insulation blanket.
Figure 8:
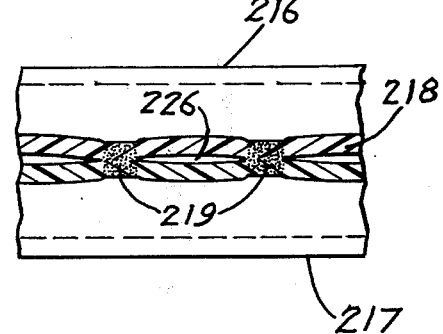
FIG. 8 is a fragmentary sectional view taken along line 8—8 of FIG. 7.

Referring to FIGS. 7 and 8, there is shown a concrete insulation blanket 214 having an upper sheet member 216 and a lower sheet member 217 forming a cover which encloses a heat insulating core 221. The outer peripheral edges 218 of the sheet member 216 and 217 are secured together with heat seals or fused portions 219. As shown in FIG. 8, the adjacent fused portions are separated from each other so that the edges 218 can separate from each other to form passages 226 which allow air and moisture to flow from between sheet members 216 and 217.

The material used in the outer sheet members 16, 116, 216 and 17, 117, 217 is a plastic film or sheet material that is flame resistant and self-extinguishing. The plastic film is relatively lightweight and flexible so that the blanket can be rolled, making it easy to store and transport. The plastic is also water repellent so as not to absorb or retain moisture. The plastic film is woven, laminated and/or reinforced to withstand job site abuse. Also, the plastic film has a relatively smooth outer surface that does not adhere to the surface of the wet concrete. The plastic film can be polyvinyl chloride having flame resistant additives. The natural flame resistant qualities of polyvinyl chloride film are enhanced with the addition of antimony oxide. The flame resistant properties of the polyvinyl chloride are further improved with plasticizers, such as phosphate esters and bromated or chlorinated phosphates. The plasticizers also benefit from the inclusion of antimony oxide. Examples of additives which are used to enhance the flame resistant characteristics of polyvinyl chloride include alkyl diaryl phosphate, cresyl diphenyl phosphate, diethyl-3-acetyl-4-hydroxybenzyl phosphate, hexabromobenzene, tri(bromochloroisoproplyl) phosphate, octyl diphenyl phosphate, tricesyl phosphate, halogenated hydrocarbons, trioctyl phosphate, triphenyl phosphate, trixylenyl phosphate, tri-isopropylphenylphosphate and phenylisopropylphenylphosphate. The material used to fabricate the core 21 can be the same material as used to make outer sheet members 16 and 17.

The core can be made of other materials that are flame resistant, such as a flexible polystyrene foam having additives such as trisphosphate, hexabromocyclododecane, and the like. Polyurethane foam having flame resistant additives can be used in lieu of core 21. Polyols containing bromine, chlorine and phosphorous are used in formulating flame resistant polyurethane foams. Additives used with flexible polyurethane foams include trisphosphate and high molecular weight chlorinated phosphate esters. Polyolefin foams, as polypropylene and polyethylene, with flame resistant additives or coatings may be used as cores 21, 121 or 221.

While there have been shown and described preferred embodiments of the concrete insulation blanket, it is understood that changes in the blanket structures and materials can be made by those skilled in the art without departing from the invention.

The embodiments of the invention in which an exclusive property or privilege is claimed are defined as follows:

1. An insulation blanket for covering concrete comprising: an elongated generally flat and flexible core of insulating material, said core having a first sheet member and a second sheet member, said second sheet member having a plurality of cup-shaped portions and being secured to the first sheet member to define separate chambers containing a gas, cover means located around said core to confine the core within the cover means, said cover means including a first flexible sheet member located adjacent one side of the core and a second flexible sheet member located adjacent the other side of the core, said first and second sheet members of the cover means comprising flame resistant sheet material, connecting means attaching spaced portions of the outer peripheral edges of the first and second sheet members of the cover means together to enclose the core within the cover means, said first and second sheet members being unattached at their peripheries between said connecting means thereby allowing moisture and air to flow out from between the sheet members of the cover means between said connecting means, and a plurality of holding assemblies mounted on the first and second sheet members of the cover means and extended through said core for holding the core in a generally flat position between the first and second sheet members of the cover means.

2. The blanket of claim 1 wherein: the first and second sheet members of the core comprise flame resistant plastic sheet material.

3. The blanket of claim 2 wherein: the plastic sheet material is polyvinyl chloride having flame resistant additives.

4. The blanket of claim 1 wherein: the first and second sheet members of the cover means comprise flame resistant plastic sheet material.

5. The blanket of claim 4 wherein: the plastic sheet material is polyvinyl chloride having flame resistant additives.

6. The blanket of claim 1 wherein: each holding assembly has a first member with a tubular body and a second member with a shaft, said shaft being located with a tight friction fit in the tubular body to hold the assembly on the first and second sheet members of the cover means.

7. The blanket of claim 1 wherein: the connecting means comprise stitches securing the edges together.

8. The blanket of claim 1 wherein: the connecting means comprise welds securing the edges together.

9. The blanket of claim 1 wherein: the core has a plurality of layers of insulating means, each insulating means having a first sheet member and a second sheet member, said second sheet member having a plurality of cup-shaped portions defining separate chambers containing a gas.

10. A flame resistant insulation blanket for covering concrete comprising: an elongated generally flat and flexible core of insulation material, said core comprising flame resistant flexible closed cell sheet material, cover means located around the core to confine the core within the cover means, said cover means having a flexible first sheet member located adjacent one side of the core and a flexible second sheet member located adjacent the other side of the core, said first and second sheet members of the cover means comprising flame resistant material, and connecting means attaching spaced portions of the outer peripheral edges of the first and second sheet members of the cover means together to enclose the core within the cover means, said first and second sheet members being unattached at their peripheries between said connecting means allowing moisture and air to flow out from between the sheet members of the cover means between said connecting means.

11. The blanket of claim 10 wherein: the sheet members of the cover means are made of flame resistant plastic sheet material.

12. The blanket of claim 11 wherein: the plastic sheet material is polyvinyl chloride having flame resistant additives.

13. The blanket of claim 10 wherein: the connecting means comprise stitches securing the edges together.

14. The blanket of claim 10 wherein: the connecting means comprise welds securing the edges together.

15. The blanket of claim 10 including: a plurality of holding assemblies attached to the first and second sheet members of the cover means and extended through the core for holding the core in a generally flat position between the first and second sheet members of the cover means.

16. The blanket of claim 15 wherein: each holding assembly has a first member with a tubular body and a second member with a shaft, said shaft being located with a tight friction fit in the tubular body to hold the assembly on the first and second sheet members.

17. The blanket of claim 10 wherein: the core includes an insulating member having a plurality of separate wall structures defining separate gas chambers.

18. The blanket of claim 10 wherein: the material of the core is a closed cell polyolefin foam having flame resistant additives.

19. A flame resistant insulation blanket for covering concrete comprising: an elongated generally flat and flexible core of insulation material, cover means located around the core to confine the core within the cover means, said cover means having a flexible first sheet member located adjacent one side of the core and a flexible second sheet member located adjacent the other side of the core, connecting means attaching outer peripheral edges of the first and second sheet members of the cover means together to enclose the core within the cover means, said connecting means comprising means securing spaced portions of the peripheral edges of the first and second sheet members of the cover means together thereby allowing moisture and air to flow out from between the sheet members of the cover means between said connecting means, and a plurality of holding assemblies mounted on the first and second sheet members of the cover means and extended through said core for holding the core in a generally flat position between the first and second sheet members of the cover means.

20. The blanket of claim 19 wherein: the first and second sheet members of the core comprise flame resistant sheet material.

21. The blanket of claim 19 wherein: the first and second sheet members of the cover means comprise flame resistant sheet material.

22. The blanket of claim 19 wherein: each holding assembly has a first member with a tubular body and a second member with a shaft, said shaft being located in tight friction fit in the tubular body to hold the assembly on the first and second sheet members of the cover means.

* * * * *

UNITED STATES PATENT AND TRADEMARK OFFICE
CERTIFICATE OF CORRECTION

PATENT NO. : 4,038,447
DATED : July 26, 1977
INVENTOR(S) : Wayne C. Brock

It is certified that error appears in the above-identified patent and that said Letters Patent are hereby corrected as shown below:

Column 1, line 18, "as" should be --has--.

Column 2, line 52, "31" should be --3.1--.

Column 3, line 37, "32" should be --31--.

Signed and Sealed this

Twenty-ninth Day of November 1977

[SEAL]

Attest:

RUTH C. MASON
Attesting Officer

LUTRELLE F. PARKER
Acting Commissioner of Patents and Trademarks